(12) United States Patent
De Leon et al.

(10) Patent No.: US 12,299,260 B2
(45) Date of Patent: *May 13, 2025

(54) PRESENTATION AND CONTROL OF USER INTERACTIONS WITH A TIME-DEPENDENT USER INTERFACE ELEMENT

(71) Applicant: Capital One Services, LLC, McLean, VA (US)

(72) Inventors: Erik Jay Salazar De Leon, Richmond, VA (US); Thomas Dohan, II, Elmhurst, IL (US); Charles Richard Hollins, Mechanicsville, VA (US); Jennifer Wilkens, New Kent, VA (US); Albert Berger, Arlington, VA (US); John Heiner, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/533,650

(22) Filed: Dec. 8, 2023

(65) Prior Publication Data

US 2024/0103698 A1     Mar. 28, 2024

Related U.S. Application Data

(63) Continuation of application No. 17/652,158, filed on Feb. 23, 2022, now Pat. No. 11,842,037.

(51) Int. Cl.
*G06F 3/048* (2013.01)
*G06F 3/0481* (2022.01)
(Continued)

(52) U.S. Cl.
CPC .......... *G06F 3/0484* (2013.01); *G06F 3/0481* (2013.01); *G06F 3/04883* (2013.01)

(58) Field of Classification Search
CPC .................................................... G06F 3/0484
See application file for complete search history.

(56) References Cited

U.S. PATENT DOCUMENTS

| | | | |
|---|---|---|---|
| 6,338,048 B1 | 1/2002 | Mori | |
| 7,742,994 B1 * | 6/2010 | Gupta | G06Q 20/382 |
| | | | 705/64 |

(Continued)

OTHER PUBLICATIONS

Meltsov et al., Development of an Intelligent Module for Monitoring and Analysis of Client's Bank Transactions, 2019, IEEE, 8 pages. (Year: 2019).*

(Continued)

*Primary Examiner* — Linh K Pham
(74) *Attorney, Agent, or Firm* — Harrity & Harrity, LLP

(57) ABSTRACT

In some implementations, a user device may present, on a user interface (UI) associated with a user account, a first UI element. The user device may detect a user interaction, with the user device, indicating the first UI element. The user device may present, on the UI and based on the user interaction, a second UI element, which increases in length in a first direction from a start point, along a closed path around the first UI element and ending at the start point, while the user interaction is being detected. The second UI element completes the closed path when an interaction duration satisfies a duration threshold, which indicates a confirmation of a request for an action associated with the user account. The duration threshold is based on one or more parameters associated with one or more of the action, the user account, or the user interaction.

20 Claims, 9 Drawing Sheets

(51) Int. Cl.
   *G06F 3/0484*      (2022.01)
   *G06F 3/04883*     (2022.01)

(56) References Cited

U.S. PATENT DOCUMENTS

| | | | |
|---|---|---|---|
| 8,843,239 | B2 | 9/2014 | Mighdoll et al. |
| 10,296,128 | B1* | 5/2019 | Nold .................. G06F 3/04883 |
| 10,749,935 | B1 | 8/2020 | Bush |
| 11,983,387 | B2* | 5/2024 | De Leon ............... G06Q 40/02 |
| D1,029,848 | S* | 6/2024 | De Leon ..................... D14/485 |
| D1,030,793 | S* | 6/2024 | De Leon ..................... D14/486 |
| 2007/0033174 | A1 | 2/2007 | Cornacchia |
| 2008/0165396 | A1 | 7/2008 | Brodersen et al. |
| 2009/0020343 | A1 | 1/2009 | Rothkopf et al. |
| 2012/0130547 | A1 | 5/2012 | Fadell et al. |
| 2013/0057500 | A1 | 3/2013 | Kulczycki |
| 2013/0268260 | A1* | 10/2013 | Lundberg ............ G06F 11/3664 704/8 |
| 2013/0345883 | A1 | 12/2013 | Sloo et al. |
| 2014/0058567 | A1 | 2/2014 | Matsuoka et al. |
| 2014/0074575 | A1* | 3/2014 | Rappoport ........ G06Q 30/0222 705/14.51 |
| 2014/0354648 | A1* | 12/2014 | Bak ........................ G06F 16/00 345/440 |
| 2018/0014387 | A1 | 1/2018 | Bard et al. |
| 2018/0116040 | A1 | 4/2018 | Mann et al. |
| 2018/0335928 | A1* | 11/2018 | Van Os ................ G06Q 20/204 |
| 2018/0336543 | A1* | 11/2018 | Van Os ................... G06F 3/167 |
| 2019/0378481 | A1 | 12/2019 | O'Donnell et al. |
| 2020/0143464 | A1* | 5/2020 | Caldwell ............... G06Q 40/02 |
| 2020/0379593 | A1 | 12/2020 | De Vries et al. |
| 2021/0049682 | A1* | 2/2021 | Roselli .................. G06Q 20/12 |
| 2022/0076537 | A1* | 3/2022 | Lerner ................. G07F 17/323 |
| 2022/0221117 | A1 | 7/2022 | Dansalami et al. |
| 2023/0035049 | A1 | 2/2023 | Gupta |
| 2023/0266865 | A1 | 8/2023 | De Leon et al. |

OTHER PUBLICATIONS

Allan et al., Towards Fraud Detection Methodologies, 2024, IEEE, 6 pages (Year: 2024).*

Leung et al., On designing a flexible e-payment system with fraud detection capability, 2004, IEEE, 8 pages. (Year: 2004).*

Camino et al., On designing a flexible e-payment system with fraud detection capability, 2017, IEEE, 10 pages. (Year: 2017).*

International Search Report and Written Opinion for Application No. PCT/US2023/060969, mailed on Apr. 17, 2023, 11 pages.

* cited by examiner

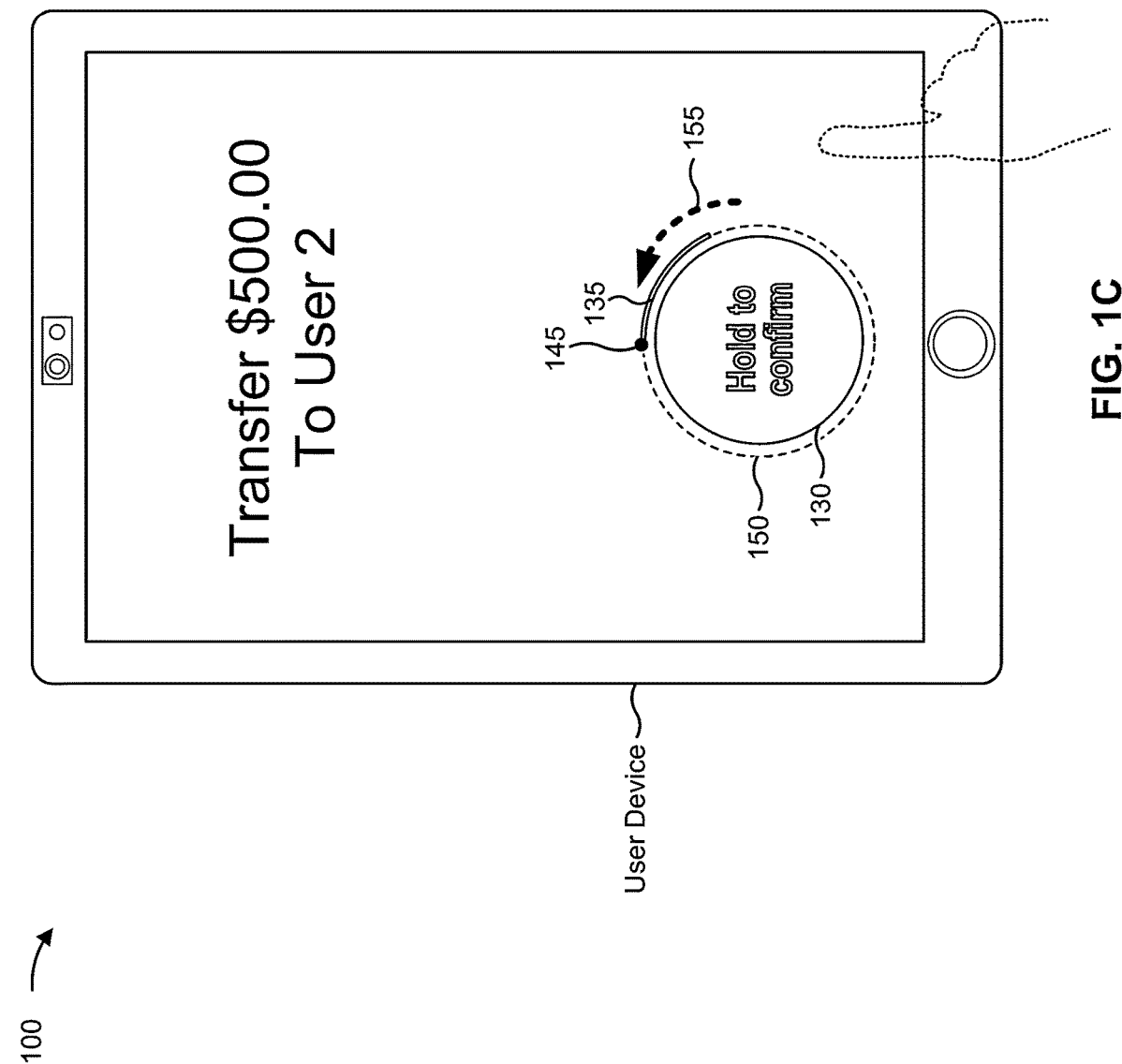

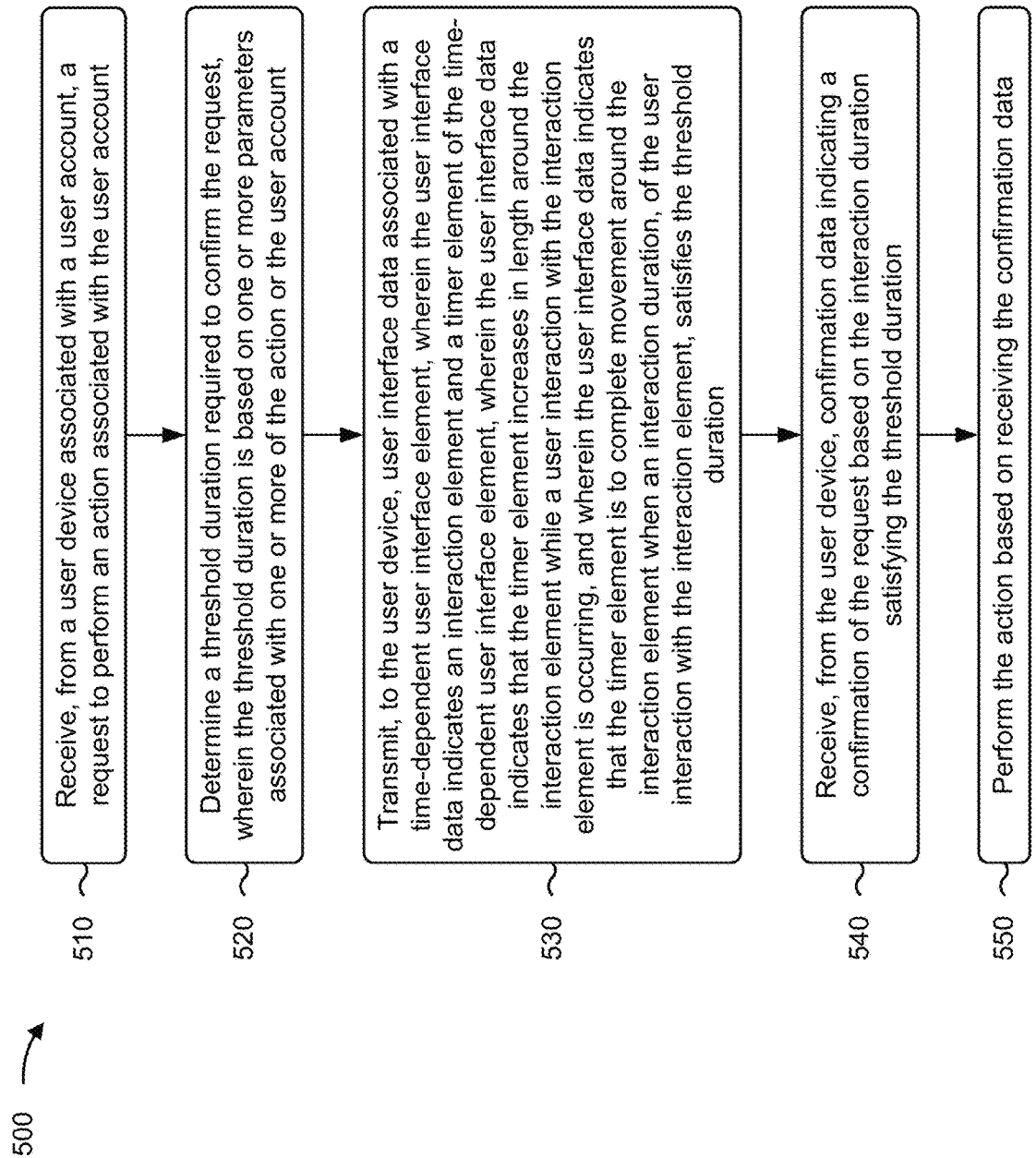

PRESENTATION AND CONTROL OF USER INTERACTIONS WITH A TIME-DEPENDENT USER INTERFACE ELEMENT

RELATED APPLICATION

This application is a continuation of U.S. patent application Ser. No. 17/652,158, filed Feb. 23, 2022 (now U.S. Pat. No. 11,842,037), which is incorporated herein by reference in its entirety.

BACKGROUND

A display of a user device may display a user interface (e.g., a graphical user interface). A user interface may permit interactions between a user of the user device and the user device. In some cases, the user may interact with the user interface to operate and/or control the user device to produce a desired result. For example, the user may interact with the user interface of the user device to cause the user device to perform an action. Additionally, the user interface may provide information to the user.

SUMMARY

Some implementations described herein relate to a user device configured to present a time-dependent user interface element. The user device may include a memory and one or more processors communicatively coupled to the memory. The one or more processors may be configured to present, on a user interface associated with a user account, a first user interface element of the time-dependent user interface element. The one or more processors may be configured to detect a user interaction, with the user device, that indicates the first user interface element. The one or more processors may be configured to present, on the user interface and based on the user interaction, a second user interface element of the time-dependent user interface element.

Some implementations described herein relate to a method for presenting a time-dependent user interface element. The method may include transmitting, by a user device and to a system, a request for an action associated with a user account to be performed. The method may include receiving, by the user device and from the system, user interface data associated with the time-dependent user interface element, wherein the user interface data indicates an interaction element and a timer element of the time-dependent user interface element. The method may include presenting, by the user device and on a user interface of the user device, the interaction element. The method may include detecting, by the user device, a user interaction with the interaction element. The method may include presenting, by the user device and on the user interface, the timer element, wherein the timer element is formed over time around the interaction element in a first direction while the user interaction with the interaction element is detected, where a formation rate at which the timer element is formed around the interaction element is based on a duration threshold indicated in the user interface data, where the timer element completes movement around the interaction element when an interaction duration, of the user interaction, satisfies the duration threshold, and where the duration threshold is based on one or more parameters associated with one or more of the action, the user account, or the user interaction.

Some implementations described herein relate to a system for providing data for presentation of a time-dependent user interface element. The system may include one or more memories and one or more processors communicatively coupled to the one or more memories. The one or more processors may be configured to receive, from a user device associated with a user account, a request to perform an action associated with the user account. The one or more processors may be configured to determine a duration threshold required to confirm the request, wherein the duration threshold is based on one or more parameters associated with one or more of the action or the user account. The one or more processors may be configured to transmit, to the user device, user interface data associated with the time-dependent user interface element, wherein the user interface data indicates an interaction element and a timer element of the time-dependent user interface element. The one or more processors may be configured to receive, from the user device, confirmation data indicating a confirmation of the request based on the interaction duration satisfying the duration threshold. The one or more processors may be configured to perform the action based on receiving the confirmation data.

BRIEF DESCRIPTION OF THE DRAWINGS

FIGS. 1A-1E are diagrams of an example implementation relating to presentation and control of user interactions with a time-dependent user interface element.

FIGS. 4-5 are flowcharts of example processes relating to presentation and control of user interactions with a time-dependent user interface element.

DETAILED DESCRIPTION

Figure 1A:
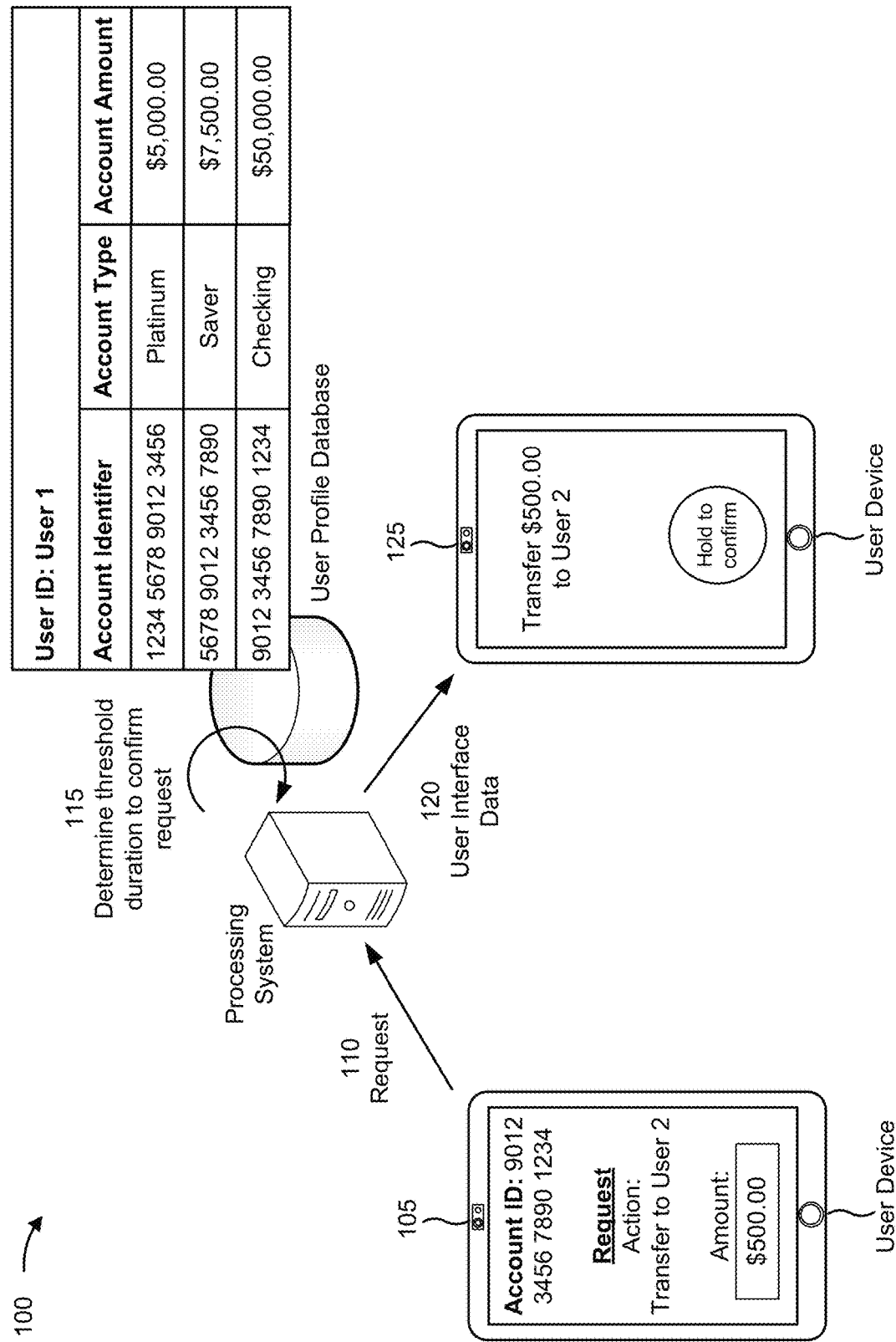

The following detailed description of example implementations refers to the accompanying drawings. The same reference numbers in different drawings may identify the same or similar elements.

A user may desire to have a particular action performed (e.g., an action related to an account of the user, such as paying a balance, transferring funds from the account, or renewing the account). The user may request the action via a device of the user (e.g., through an application installed on the device or a web-based application accessed via the device). In order to confirm the request, the user is often presented with a query on the device of whether or not the user is sure that the user wants to perform the action, which the user may confirm or deny by selecting corresponding "Yes" or "No" selections also presented on the device. However, the user may accidentally select "Yes" (e.g., by not carefully reading a particular prompt, by not paying attention to the selections, or by simply pressing the wrong button) when the user actually did not intend for the action to be performed. As a result, the action may be undesirably performed, and remedial actions, if they exist, may need to be performed in order to correct the undesired action. Thus, it is desirable for a user interface (UI) to provide a user-friendly way for the user to confirm a requested action that requires a certain level of attention by the user and with a level of certainty before the action will be initiated and/or performed.

Some implementations described herein enable a system to provide data for presentation of a UI element (e.g., a time-dependent UI element) that provides a user with a visual indication of a duration required to confirm an action requested by the user. The UI element may include a first UI element with which the user may interact. Upon detection of the user interaction with the first UI element, a second UI element may begin forming around the first UI element. While the user interaction with the first UI element is occurring, the second UI element may complete a closed path around the first UI element, indicating a confirmation of the requested action. A duration of the user interaction with the first UI element to confirm the request may be based on information related to the particular request, with an account of the user, and/or with the user interaction.

Accordingly, the UI element may provide a user-friendly visualization of a duration required to confirm that a particular action is intended to be performed and will not be mistakenly performed. As a result, the system may initiate and/or perform the action at a high rate of certainty and accuracy. Additionally, because of the high rate of certainty and accuracy, computing resources may be conserved by not having to be used to undo and/or account for mistaken actions. Further, by relating the duration required to complete the confirmation to particular aspects of the action and/or a related account of the user, more important actions may be required to receive higher levels of confirmation (e.g., longer durations for confirmation) than less important actions, further improving the certainty and accuracy of the actions being performed.

FIGS. 1A-1E are diagrams of an example 100 associated with presentation and control of user interactions with a time-dependent UI element. As shown in FIGS. 1A-1E, example 100 includes a processing system, a user profile dataset, and a user device. These devices are described in more detail in connection with FIGS. 2 and 3.

As shown in FIG. 1A, a user may access an account of the user (e.g., a user account) via the user device, such as via an application installed on the user device or via a web-based application accessed on the user device. The user and user account may be associated with a user identifier (e.g., the user's login or username) by which the user and user account may be identified. The user account may have one or more accounts (also referred to as sub-accounts), each having a unique account identifier (e.g., an account ID number, a primary account number (PAN), or a virtual card number) associated with the particular sub-account. Each sub-account and corresponding account identifier may be associated with an account type (e.g., credit, checking, savings, or rewards).

The user may desire to perform an action related to one of the account identifiers. For example, the user may want to pay a balance of a sub-account corresponding to the particular account identifier. As another example, the user may want to transfer funds from the sub-account to a third party (e.g., another user, a merchant, or a service provider). As shown by reference number 105, the user may specify the requested action and any additional information (e.g., an amount associated with the requested action) via the user device. The user may select the requested action and/or the additional information from respective lists or libraries of selectable options (e.g., in drop-down menus). Additionally, or alternatively, the user may manually enter the requested action and/or the additional information in dedicated entry fields presented on the user device. As shown by reference number 110, the user device may transmit, and the processing system may receive, request data indicating the requested action. The request data also may indicate or be accompanied by the particular account identifier and/or the user identifier. Alternatively, the processing system may already have the particular account identifier and/or the user identifier prior to the request (for example, when the user logged into the user account and/or accessed the sub-account associated with the particular account identifier).

A particular requested action may require a confirming action by the user and/or user device to confirm that the requested action is intended to be performed. The confirming action may have a duration threshold for which the confirming action needs to be performed in order to sufficiently confirm the requested action. As shown by reference number 115, the processing system may determine the duration threshold based on one or more parameters. The parameter(s) may be associated with the requested action (e.g., the particular requested action and/or an action amount associated with the requested action), as indicated by the request data, and/or the account information (e.g., an account amount or balance and/or the account type associated with the particular account identifier).

In some implementations, the duration threshold may be based on the particular requested action (e.g., an action type associated with the requested action). For example, if the action type is payment of a balance of a sub-account corresponding to the particular account identifier, then the duration threshold may be a first set value (e.g., 1 second, 2 seconds, or 3 seconds). As another example, if the action type is a transfer of funds from the sub-account, then the duration threshold may be a second set value (e.g., 1 second, 2 seconds, or 3 seconds). As another example, if the action type is a renewal of the sub-account, then the duration threshold may be a third set value (e.g., 1 second, 2 seconds, or 3 seconds). The set values (e.g., the first set value, the second set value, or the third set value) associated with any of the requested actions may be the same as or may be different from one another.

Additionally, or alternatively, the duration threshold may be based on the action amount. In some implementations, different ranges of action amounts may require different duration thresholds. For example, if the requested action is to pay a balance of the sub-account or to transfer funds, and the action amount (e.g., the balance or the transfer amount) is within a first range (e.g., $1-$1000), then the duration threshold may be a first set value (e.g., 1 second). If the action amount is within a second range (e.g., $1001-$5000), then the duration threshold may be a second set value (e.g., 2 seconds) that is greater than the first set value. If the action amount is within a third range (e.g., greater than $5000), then the duration threshold may be a third set value (e.g., 3 seconds) that is greater than the second set value.

Additionally, or alternatively, the duration threshold may be based on the account amount or balance associated with the particular account identifier. For example, if the sub-account corresponding to the particular account identifier has an account amount within a first range (e.g., $1-$10,000), then the duration threshold may be a first set value (e.g., 1 second). If the account amount is within a second range (e.g., $10,001-$50,000), then the duration threshold may be a second set value (e.g., 2 seconds) that is greater than the first set value. If the account amount is within a third range (e.g., greater than $50,000), then the duration threshold may be a third set value (e.g., 3 seconds) that is greater than the second set value.

Additionally, or alternatively, the duration threshold may be based on a relationship (e.g., a ratio or a percentage) between the action amount and the account amount. For example, if a percentage of the action amount relative to the account amount is within a first percentage range (e.g., 1%-10%), then the duration threshold may be a first set value (e.g., 1 second). If the percentage of the action amount relative to the account amount is within a second percentage range (e.g., 11%-50%), then the duration threshold may be a second set value (e.g., 2 seconds) that is greater than the first set value. If the percentage of the action amount relative to the account amount is within a third percentage range (e.g., greater than 50%), then the duration threshold may be a third set value (e.g., 3 seconds) that is greater than the second set value.

Additionally, or alternatively, the duration threshold may be based on the account type associated with the particular account identifier. For example, if the account type is a rewards account type, then the duration threshold may be a first set value (e.g., 1 second, 2 seconds, or 3 seconds). As another example, if the account type is a credit account type, then the duration threshold may be a second set value (e.g., 1 second, 2 seconds, or 3 seconds). As another example, if the account type is a checking account type or a savings account type, then the duration threshold may be a third set value (e.g., 1 second, 2 seconds, or 3 seconds). The set values (e.g., the first set value, the second set value, or the third set value) associated with any of the account types may be the same as or may be different from one another.

Based on the duration threshold, the processing system may determine characteristics of the time-dependent UI element, as described in connection with FIGS. 1B-1D. As shown by reference number 120, the processing system may transmit, and the user device may receive, UI data indicating the time-dependent UI element. As shown by reference number 125, the user device may present the time-dependent UI element on a display or UI of the user device.

Figure 1B:
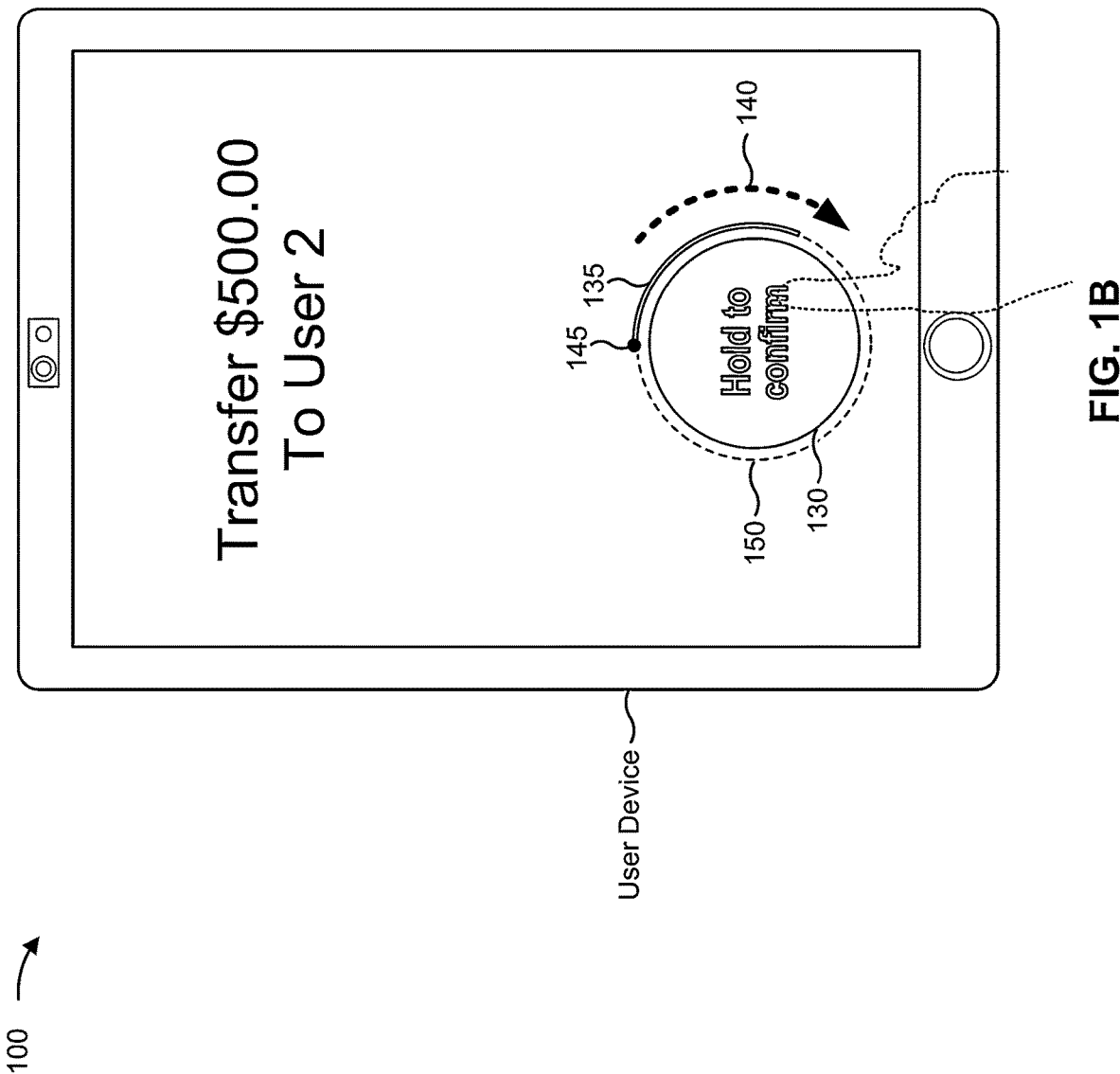
Figure 1D:
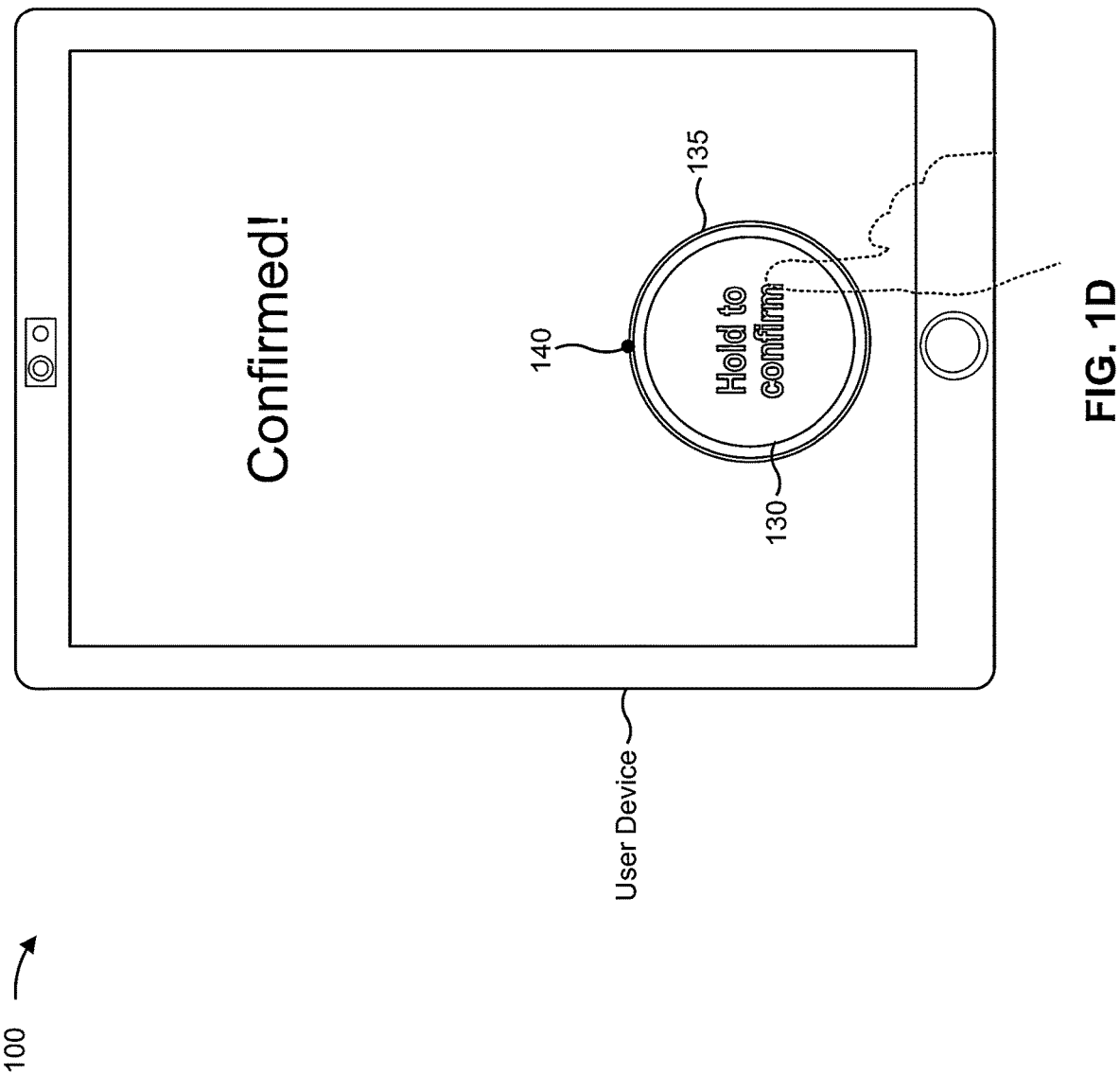

As shown in FIGS. 1B-1D, the user device may present on the UI a first UI element (or interaction element) 130 of the time-dependent UI element, as indicated by the UI data. In some implementations, the first UI element 130 may be a circular element or any other element having a curved or rounded profile (e.g., an oval element). Alternatively, the first UI element 130 may have any other geometric or non-geometric shape. The first UI element 130 may be interactable, and the user device may detect a user interaction that indicates the first UI element 130. For example, the user device may detect when the user touches and/or presses the first UI element 130, such as on a touchscreen display of the user device as shown in FIG. 1B. Additionally, or alternatively, the user device may detect when a cursor, controlled by the user on the user device, hovers over the first UI element 130 and/or when the user clicks and holds a button (e.g., on a mouse or keyboard connected to the user device) when the cursor is over the first UI element 130.

Based on detecting the user interaction with the first UI element 130, the user device may present on the display a second UI element (or timer element) 135, of the time-dependent UI element, as indicated by the UI data. As shown in FIG. 1B, the second UI element 135 may increase in length (e.g., form) in a first direction 140 from a start point 145, along a closed path 150 around the first UI element 130, while the user interaction with the first UI element 130 is being detected (e.g., while the user is touching and/or pressing the first UI element 130). In implementations in which the first UI element 130 is a circular element, the second UI element 135 may be an arc element, and the closed path 150 may extend circumferentially around the circular element.

In some implementations, the one or more parameters, on which the duration threshold may be based, may be associated with the user interaction with the first UI element 130. For example, the user device may determine a pressure of the user interaction with the first UI element 130. If the pressure of the user interaction satisfies a pressure threshold (e.g., is at or exceeds the pressure threshold), then the user device may begin presenting the second UI element 135. Additionally, as the second UI element 135 increases in length in the first direction 140, the pressure threshold required may decrease. For example, the pressure threshold may decrease linearly with the duration of the user interaction (e.g., the interaction duration) with the first UI element 130. Alternatively, the pressure threshold may decrease exponentially or logarithmically with the interaction time. Alternatively, the pressure threshold may decrease in stepped amounts (e.g., the pressure threshold is at a first pressure value for the first 15 seconds, at a second pressure value for the next 15 seconds, and at a third pressure value for the remaining time of the duration threshold).

In some implementations, the user device and/or the processing system may determine a rate at which the second UI element 135 is to increase in length (e.g., a formation rate) in the first direction 140 based on the duration threshold and a size of the user interface. The user device may present the second UI element based on the rate. The formation rate at which the second UI element 135 increases in length may vary for user devices having different screen sizes (e.g., the second UI element 135 may increase at a slower rate on a user device having a first screen size than on a user device having a second screen size that is smaller than the first screen size). Additionally, or alternatively, the formation rate may be based on a linear function (e.g., may be constant throughout the formation of the second UI element 135). Alternatively, the formation rate may be based on a parametric function (e.g., a Bezier curve). For example, the formation rate may be slower at the beginning and the end of the formation of the second UI element 135, and faster during an intermediate formation period. Alternatively, the formation rate may be based on an exponential relationship with the interaction duration and/or the location of the second UI element 135 along the closed path 150 (e.g., the second UI element 135 may form/increase slower initially in the interaction duration than further into the interaction duration). Alternatively, the formation rate may be based on a logarithmic relationship with the interaction duration and/or the location of the second UI element 135 along the closed path 150 (e.g., the second UI element 135 may form/increase faster initially in the interaction duration than further into the interaction duration). The particular function of the formation rate (e.g., linear, parametric, exponential, or logarithmic) may depend on a condition related to the requested action (e.g., the particular requested action and/or the action amount) and/or the user account (e.g., the account type and/or the account amount).

As shown in FIG. 1C, when the user interaction ceases, as detected by the user device (or alternatively, the user device does not detect the user interaction with the first UI element 130), such as when the user is not touching and/or pressing the first UI element 130, the user device may cease presenting the second UI element 135 on the user device. Alternatively, when the user device does not detect the user interaction with the first UI element 130, the second UI element 135 may decrease in length (e.g., a formed portion of the second UI element 135 may be removed from the display or UI of the user device) in a second direction 155, which may be opposite the first direction 140, along the closed path 150. The second UI element 135 may begin decreasing in length at a point along the closed path 150 at which an end of the second UI element 135 is located when the user interaction ceases.

In some implementations, the second UI element 135 may decrease in length at a rate (e.g., a removal rate) that has a same magnitude as the formation rate. Alternatively, the removal rate may be slower than the formation rate, or may be faster than the formation rate. Additionally, or alternatively, the removal rate may be constant.

In some implementations, after the user interaction with the first UI element 130 has ceased and the second UI element 135 has begun decreasing (or has been removed from the display or UI of the user device altogether), the user device may detect a second user interaction, with the user device, that indicates the first UI element 130. In such an instance, the second UI element 135 may continue increasing in length along the closed path 150 from a point on the closed path 150 at which an end of the second UI element 135 is located when the second user interaction is detected. In instances when the second UI element 135 has completely decreased in length (e.g., back to the start point 145), the second UI element 135 may begin increasing in length from the start point 145 upon detection of the second user interaction. The formation rate at which the second UI element 135 continues formation may be the same as the formation rate during the initial user interaction with the first UI element 130.

As shown in FIG. 1D, the second UI element 135 may complete the closed path 150 when the end of the second UI element 135 reaches the start point 145. The duration for this to occur is equal to the duration threshold (e.g., the interaction duration, of the user interaction indicating the first UI element, satisfies the duration threshold), within a tolerance. The completion of the closed path 150 by the second UI element 135 provides a visual indicator to the user, indicating that the duration threshold has been satisfied and indicating confirmation of the requested action. After the requested action has been confirmed, the processing system may initiate and/or perform the requested action (e.g., pay the balance, transfer the requested funds, or renew the account or sub-account).

Figure 1E:
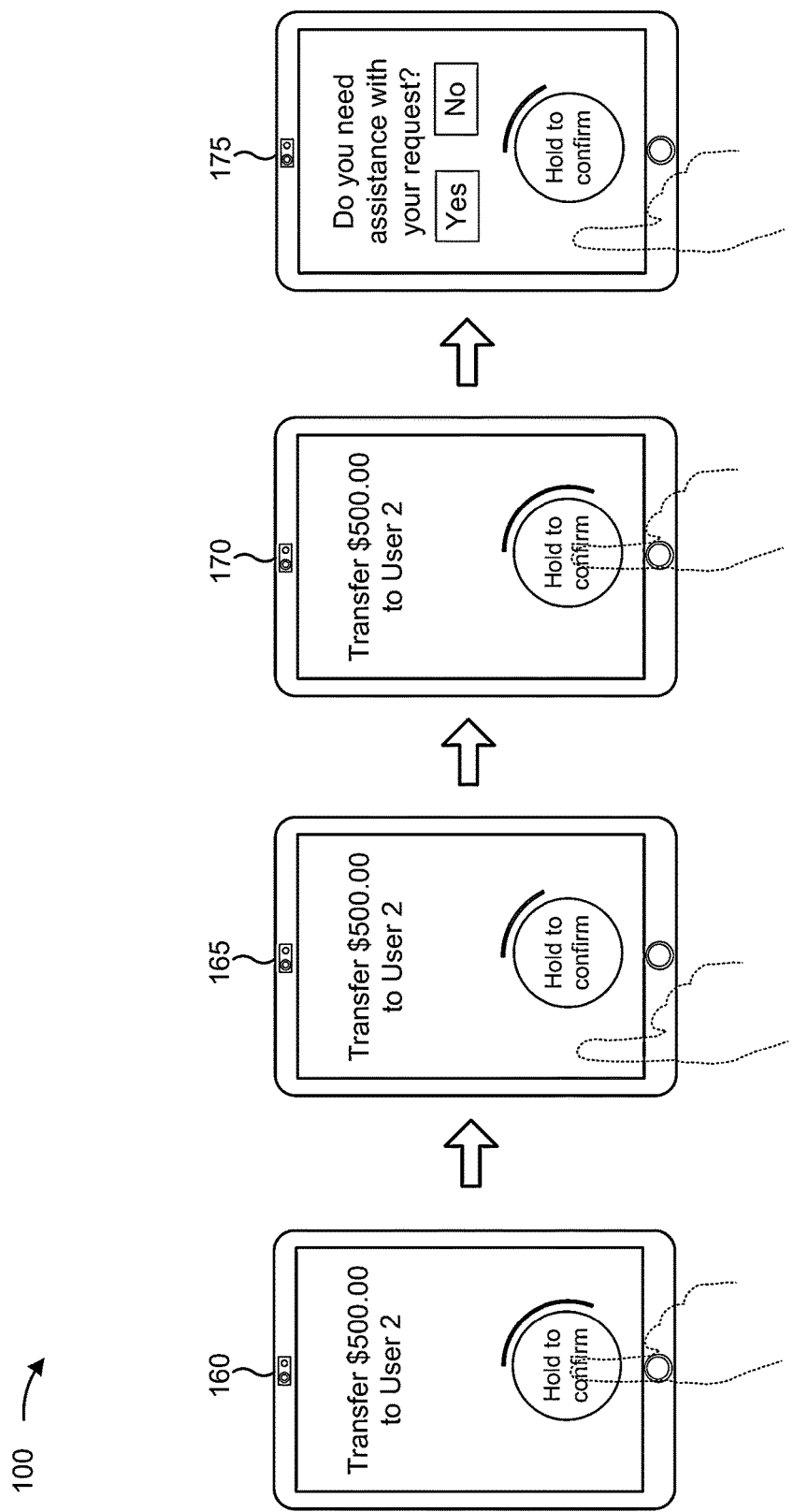

As shown in FIG. 1E, in some implementations, the user device and/or the processing system may determine uncertainty by the user with respect to the requested action, such as if the user repeatedly presses and then releases the first UI element. For example, as shown by reference number 160, the user device may detect a first user interaction with the first UI element for a first interaction duration. Then, as shown by reference number 165, the user device may detect that the first user interaction ceased, and the first interaction duration was less than the duration threshold (e.g., the second UI element did not complete the closed path).

Next, as shown by reference number 170, the user device may detect one or more subsequent interactions (e.g., a second user interaction) with the first UI element. If the second user interaction occurs within a threshold timeframe from when the first user interaction ceased, the user device may determine that the second user interaction is in connection with the first user interaction (e.g., part of the same series of user interactions with the first UI element). The threshold timeframe may be a set value (e.g., 5 seconds). Alternatively, the threshold timeframe may vary depending on how far along the closed path the second UI element has traversed. For example, the threshold timeframe may be longer the further along the closed path the second UI element is (e.g., the longer the interaction duration is). In such instances, the threshold timeframe may be the duration required for the second UI element to be completely removed from the display or UI of the user device. If the second user interaction occurs outside of the threshold timeframe, then the user device and/or processing system may determine the second user interaction to be a separate interaction from the first user interaction. For multiple subsequent user interactions, the threshold timeframe between the subsequent user interaction and the ceasing of the previous user interaction may vary depending upon the number of the subsequent user interactions. For example, the threshold timeframe between the ceasing of the first user interaction and the start of the second user interaction may be a first value (e.g., 5 seconds). The threshold timeframe between ceasing of the second user interaction and the start of a third user interaction may be a second value (e.g., 4 seconds or 6 seconds), which may be greater than or less than the first value.

If the user device detects a quantity of subsequent user interactions, each having respective interaction durations less than the duration threshold and each occurring within the respective threshold timeframe, that satisfies a quantity threshold (e.g., 3 subsequent user interactions), then the user device and/or the processing system may determine user uncertainty with respect to the requested action. Based on determining that the quantity of the subsequent interactions satisfies the quantity threshold, as shown by reference number 175, the user device may present, on the display or UI of the user device, an inquiry of whether the user requires assistance. If the user device receives an indication that assistance is required (e.g., by detecting a user selection of a confirmation option presented on the display or UI), then the user device may present helpful information (e.g., frequently asked questions) related to the requested action or customer service contact information (email, phone number, or chat). Alternatively, the user device and/or the processing system may connect the user device with a customer service agent. If the user device receives an indication that assistance is not required (e.g., by detecting a user selection of an option presented to the display or UI associated with no assistance), then the user device and/or processing system may allow the user to continue interacting with the first UI element or not interacting with the first UI element until the second UI element is removed from the display or UI. Alternatively, the user device and/or processing system may cancel the request for the particular action (e.g., the user device may transmit, to the processing system, cancellation data indicating a cancellation of the request).

Using the techniques described herein, a user device may present, on a UI, a time-dependent UI element that provides user-friendly visualization of a duration required to confirm that a particular action is intended to be performed and will not be mistakenly performed. As a result, a system initiating and/or performing the action may do so at a high rate of certainty and accuracy. Additionally, because of the high rate of certainty and accuracy, computing resources may be conserved by not having to be used to undo and/or account for mistaken actions. Further, by relating the duration required to complete the confirmation to particular aspects of the action and/or a related account of the user, more important actions may be required to receive higher levels of confirmation (e.g., longer durations for confirmation) than less important actions, further improving the certainty and accuracy of the actions being performed.

As indicated above, FIGS. 1A-1E are provided as an example. Other examples may differ from what is described with regard to FIGS. 1A-1E. For example, the duration thresholds may be any value other than 1 second, 2 seconds, or 3 seconds.

Figure 2:
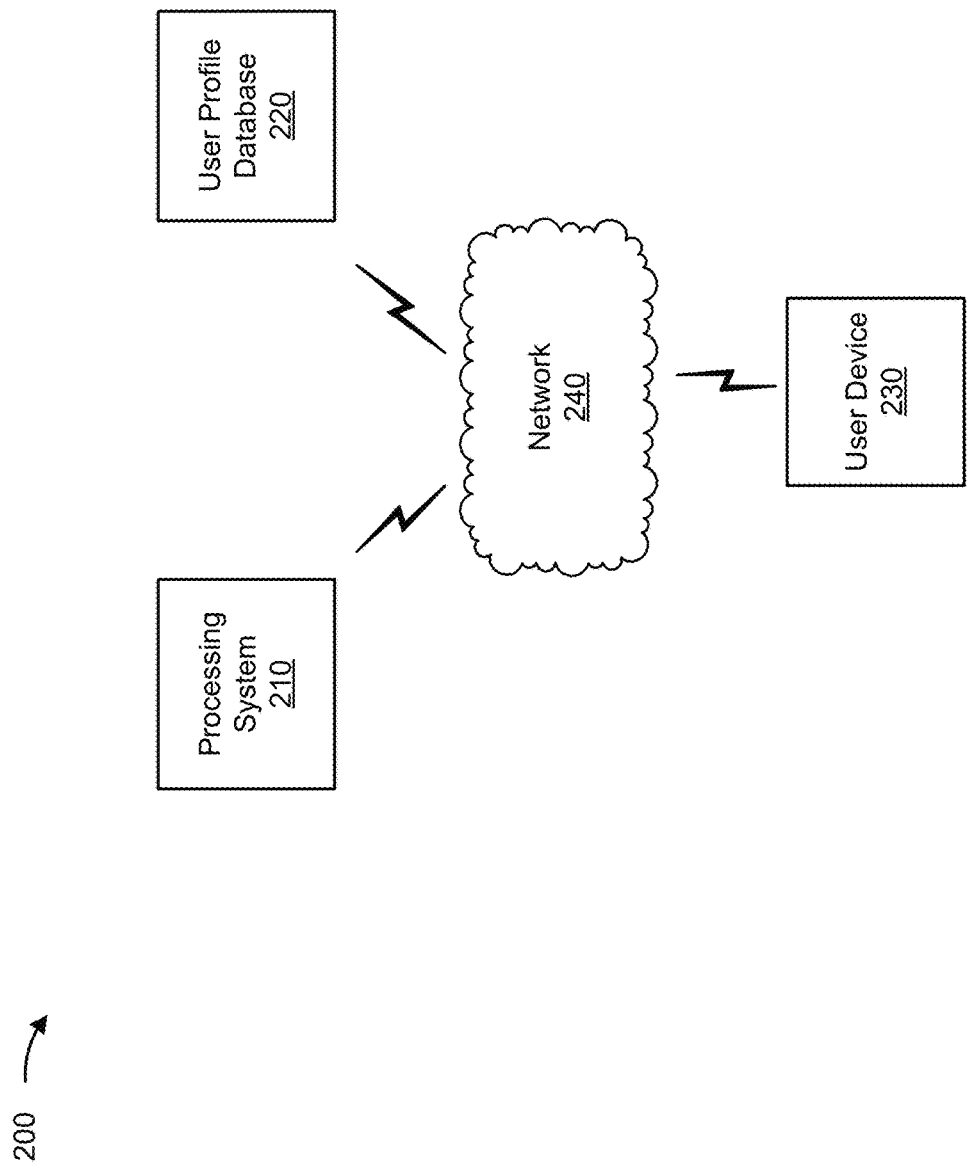
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a processing system 210, a user profile database 220, a user device 230, and a network 290. Devices of environment 200 may interconnect via wired connections, wireless connections, or a combination of wired and wireless connections.

The processing system 210 includes one or more devices capable of receiving, generating, storing, processing, providing, and/or routing information associated with presentation and control of user interactions with a time-dependent user interface element, as described elsewhere herein. The processing system 210 may include a communication device and/or a computing device. For example, the processing system 210 may include a server, such as an application server, a client server, a web server, a database server, a host server, a proxy server, a virtual server (e.g., executing on computing hardware), or a server in a cloud computing system. In some implementations, the processing system 210 includes computing hardware used in a cloud computing environment.

The user profile database 220 includes one or more devices capable of receiving, generating, storing, processing, and/or providing information associated with presentation and control of user interactions with a time-dependent user interface element, as described elsewhere herein. The user profile database 220 may include a communication device and/or a computing device. For example, the user profile database 220 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the user profile database 220 may store information associated with an account of a user, such as interaction data associated with interactions between the user and a third party, as described elsewhere herein.

The user device 230 includes one or more devices capable of receiving, generating, storing, processing, and/or providing information associated with presentation and control of user interactions with a time-dependent user interface element, as described elsewhere herein. The user device 230 may include a communication device and/or a computing device. For example, the user device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The network 240 includes one or more wired and/or wireless networks. For example, the network 240 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
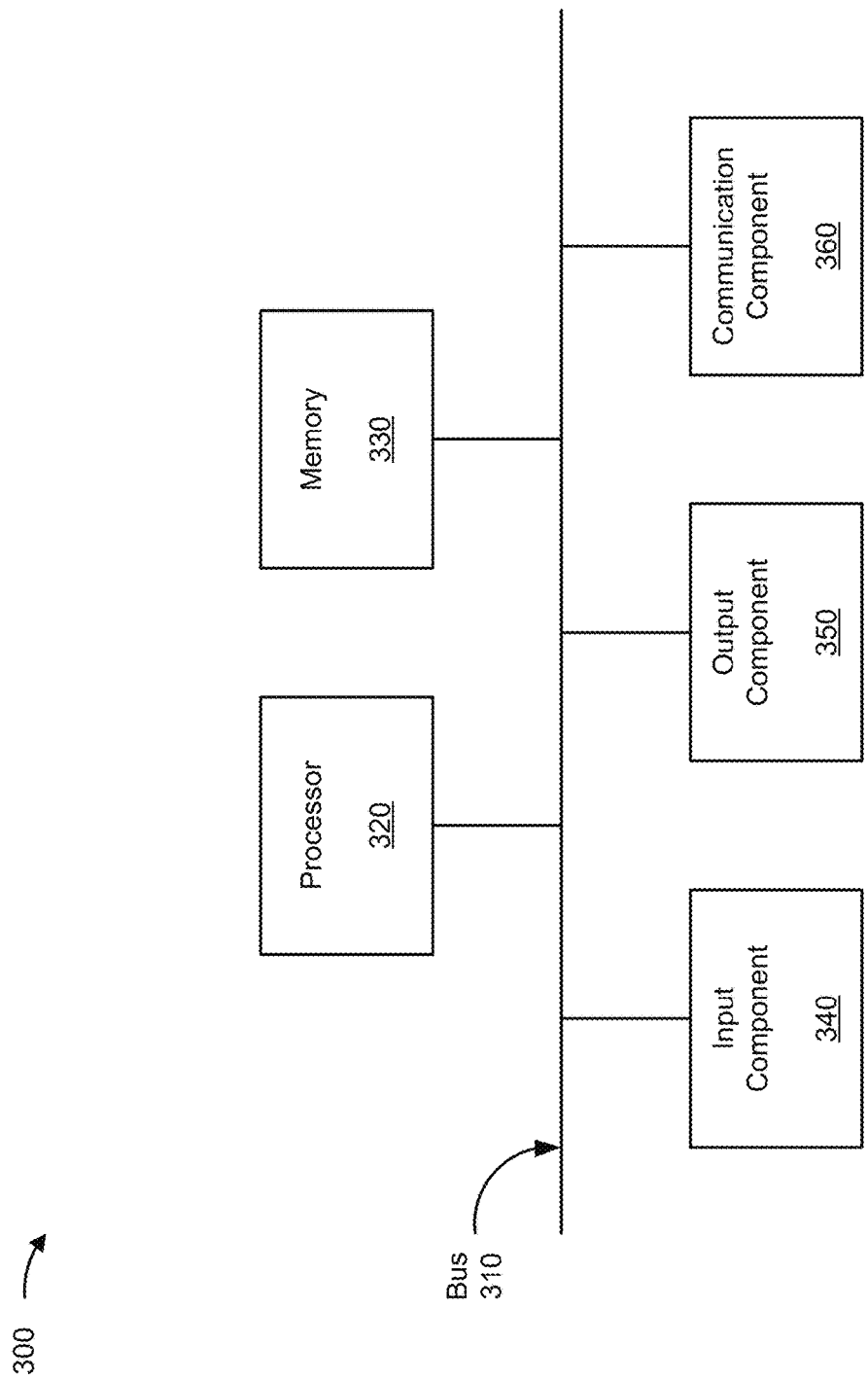
FIG. 3 is a diagram of example components of one or more devices of FIG. 2.

FIG. 3 is a diagram of example components of a device 300, which may correspond to the processing system 210, the user profile database 220, and/or the user device 230. In some implementations, the processing system 210, the user profile database 220, and/or the user device 230 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
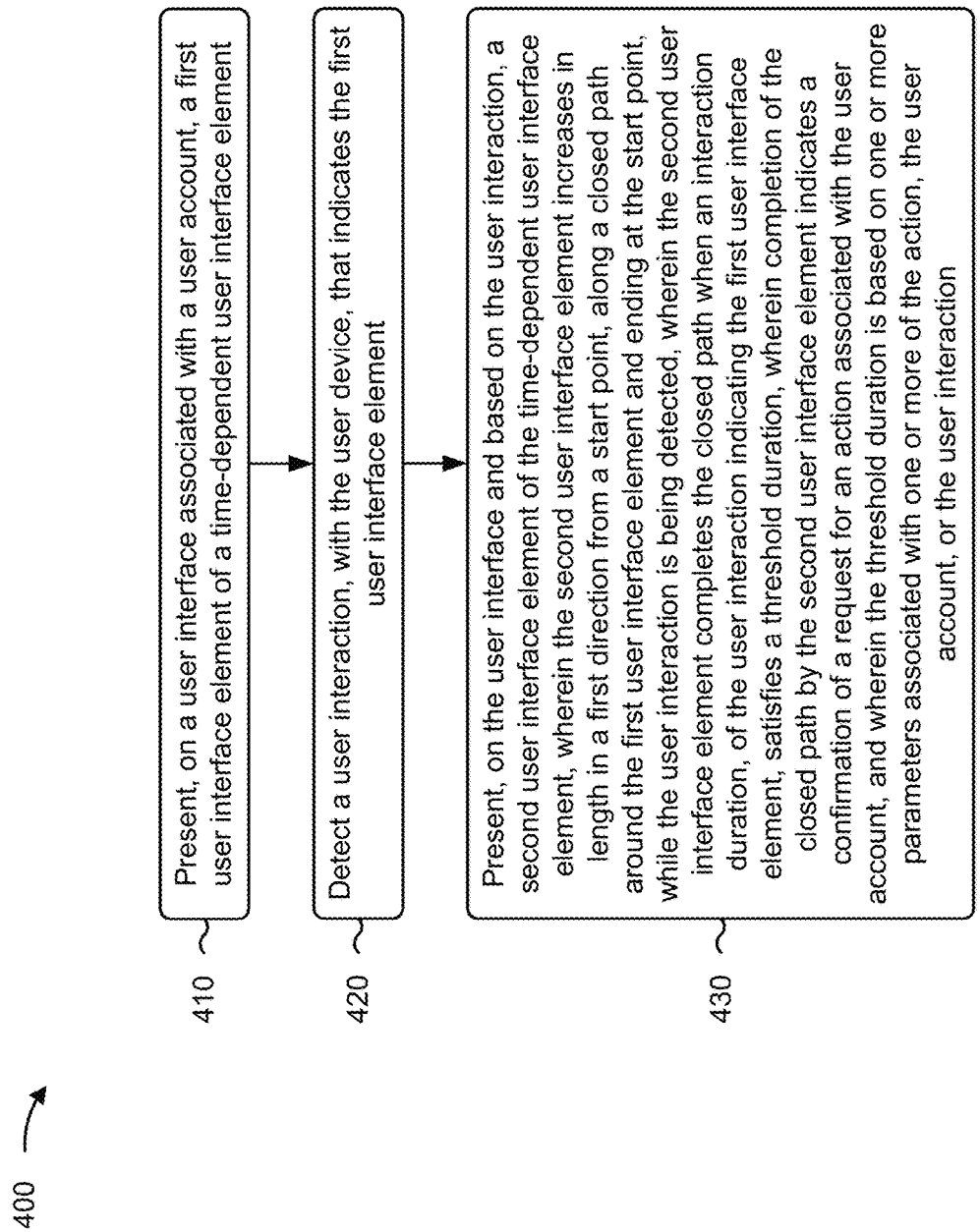

FIG. 4 is a flowchart of an example process 400 associated with presentation and control of user interactions with a time-dependent user interface element. In some implementations, one or more process blocks of FIG. 4 may be performed by a user device (e.g., user device 230). In some implementations, one or more process blocks of FIG. 4 may be performed by another device or a group of devices separate from or including the user device, such as the processing system 210. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include presenting, on a user interface associated with a user account, a first user interface element of a time-dependent user interface element (block 410). As further shown in FIG. 4, process 400 may include detecting a user interaction, with the user device, that indicates the first user interface element (block 420). As further shown in FIG. 4, process 400 may include presenting, on the user interface and based on the user interaction, a second user interface element of the time-dependent user interface element (block 430). The second user interface element increases in length in a first direction from a start point, along a closed path around the first user interface element and ending at the start point, while the user interaction is being detected. The second user interface element completes the closed path when an interaction duration, of the user interaction indicating the first user interface element, satisfies a duration threshold. Completion of the closed path by the second user interface element indicates a confirmation of a request for an action associated with the user account. The duration threshold is based on one or more parameters associated with one or more of the action, the user account, or the user interaction.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 2-3.

FIG. 5 is a flowchart of an example process 500 associated with presentation and control of user interactions with a time-dependent user interface element. In some implementations, one or more process blocks of FIG. 5 may be performed by a system (e.g., processing system 210). In some implementations, one or more process blocks of FIG. 5 may be performed by another device or a group of devices separate from or including the system, such as the user device 230. Additionally, or alternatively, one or more process blocks of FIG. 5 may be performed by one or more components of device 300, such as processor 320, memory 330, input component 340, output component 350, and/or communication component 360.

As shown in FIG. 5, process 500 may include receiving, from a user device associated with a user account, a request to perform an action associated with the user account (block 510). As further shown in FIG. 5, process 500 may include determining a duration threshold required to confirm the request, wherein the duration threshold is based on one or more parameters associated with one or more of the action or the user account (block 520). As further shown in FIG. 5, process 500 may include transmitting, to the user device, user interface data associated with a time-dependent user interface element, wherein the user interface data indicates an interaction element and a timer element of the time-dependent user interface element. The user interface data indicates that the timer element increases in length around the interaction element while a user interaction with the interaction element is occurring. The user interface data indicates that the timer element is to complete movement around the interaction element when an interaction duration, of the user interaction with the interaction element, satisfies the duration threshold (block 530). As further shown in FIG. 5, process 500 may include receiving, from the user device, confirmation data indicating a confirmation of the request based on the interaction duration satisfying the duration threshold (block 540). As further shown in FIG. 5, process 500 may include performing the action based on receiving the confirmation data (block 550).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 2-3.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user device, comprising:
   memory; and
   one or more processors, coupled to the memory, configured to:
      detect a user interaction with a user interface, associated with a user account, based on a user indicating a first user interface element via touch, via a cursor, or via a button press; and
      present, on the user interface and based on the user interaction, a second user interface element that is a time-dependent user interface element,
         wherein an aspect of the second user interface element changes while the user interaction is detected to indicate an interaction duration of the user interaction,
      confirm, or refrain from confirming, an action associated with the user account based on the interaction duration,
         wherein the action is confirmed when the interaction duration satisfies a duration threshold and the action is refrained from being confirmed when the interaction duration fails to satisfy the duration threshold, and
         wherein the duration threshold is based on one or more parameters associated with one or more currency amounts or an account type of the user account.

2. The user device of claim 1, wherein the first user interface element is a circular element, the second user interface element is an arc element, and the second user interface element increases in length in a first direction along a closed path around the first user interface element.

3. The user device of claim 2, wherein the second user interface element decreases in length in a second direction opposite the first direction and along the closed path when detection of the user interaction ceases.

4. The user device of claim 3, wherein the one or more processors are further configured to:
   detect a second user interaction, with the user device, that indicates the first user interface element,
      wherein the second user interface element continues increasing in length along the closed path when the second user interaction is detected.

5. The user device of claim 1, wherein the one or more processors are further configured to:
   detect one or more subsequent interactions indicating the first user interface element for one or more respective interaction durations less than the duration threshold,
      wherein the interaction duration is less than the duration threshold;
   determine that a quantity of the one or more subsequent interactions satisfies a quantity threshold; and
   present, on the user interface, an inquiry of whether a user of the user device requires assistance based on determining that the quantity of the one or more subsequent interactions satisfies the quantity threshold.

6. The user device of claim 1, wherein the one or more processors are further configured to:
   determine a rate at which the second user interface element is to change based on the duration threshold; and
   wherein, to present the second user interface element, the one or more processors are configured to present the second user interface element based on the rate.

7. The user device of claim 1, wherein the one or more processors are further configured to:
   determine a pressure of the user interaction indicating the first user interface element,
      wherein the one or more parameters are based on the pressure.

8. The user device of claim 7, wherein, to detect the user interaction, the one or more processors are configured to:
   determine that the pressure of the user interaction satisfies a pressure threshold,
      wherein the pressure threshold decreases as the second user interface element changes.

9. A method for presenting a time-dependent user interface element, comprising:
   receiving, by a user device and from a system, user interface data associated with the time-dependent user interface element, wherein the user interface data indicates an interaction element and a timer element of the time-dependent user interface element;
   detecting, by the user device, a user interaction with the interaction element based on a user indicating the interaction element via touch, via a cursor, or via a button press;

presenting, by the user device, the timer element, wherein the timer element is formed while the user interaction with the interaction element is detected; and confirming, or refraining from confirming, an action associated with a user account based on an interaction duration of the user interaction, wherein the timer element confirms the action when the interaction duration satisfies a duration threshold and the timer element refrains from confirming the action when the interaction duration fails to satisfy the duration threshold, and wherein the duration threshold is based on one or more parameters associated with one or more currency amounts or an account type of the user account.

10. The method of claim 9, wherein presenting the timer element comprises:

removing a formed portion of the timer element based on detecting that user interaction with the timer element has ceased.

11. The method of claim 10, wherein a removal rate at which the timer element is removed corresponds to a formation rate at which the time element is formed.

12. The method of claim 10, further comprising:

detecting a second user interaction with the interaction element after detecting that user interaction with the timer element has ceased, wherein the timer element continues formation when the second user interaction is detected.

13. The method of claim 9, wherein the interaction element is a circular element, and the timer element is an arc element.

14. The method of claim 9, further comprising:

detecting one or more subsequent user interactions with the interaction element for respective interaction durations less than the duration threshold, wherein the interaction duration is less than the duration threshold;

determining that the one or more subsequent user interactions occur within a threshold timeframe; and transmitting, to the system, cancellation data indicating a cancellation of action.

15. The method of claim 9, wherein a formation rate at which the timer element is formed is based on the duration threshold, the action, or the user account.

16. A system for providing data for presentation of a time-dependent user interface element, the system comprising:

one or more memories; and one or more processors, coupled to the one or more memories, configured to:

determine a duration threshold to confirm a request to perform an action associated with a user account, wherein the duration threshold is based on one or more parameters associated with one or more currency amounts or an account type of the user account;

transmit, to a user device, user interface data associated with the time-dependent user interface element, wherein the user interface data indicates an interaction element and a timer element of the time-dependent user interface element, wherein the user interface data indicates that the timer element changes in size while a user interaction with the interaction element is occurring, and wherein the user interaction comprises a user indicating the interaction element via touch, via a cursor, or via a button press;

receive, from the user device, confirmation data indicating a confirmation of the request based on an interaction duration, of the user interaction, satisfying the duration threshold; and perform the action based on receiving the confirmation data.

17. The system of claim 16, wherein the request includes the one or more currency amounts.

18. The system of claim 16, wherein the one or more currency amounts include an account currency amount associated with the user account.

19. The system of claim 16, wherein the one or more currency amounts include a currency amount associated with the action.

20. The system of claim 16, wherein the action is associated with an action type, and wherein the one or more processors are further configured to:

determine the duration threshold based on the action type.

* * * * *